United States Patent [19]

Durand

[11] 4,283,670

[45] Aug. 11, 1981

[54] AUTOMATIC INTEGRATOR CONTROL FOR TRANSIENTLESS SWITCHING OF CONTROLLER GAINS IN MANUAL TRACKING SYSTEMS

[75] Inventor: Tulvio S. Durand, Los Angeles, Calif.

[73] Assignee: The United States of America as represented by the Secretary of the Army, Washington, D.C.

[21] Appl. No.: 27,582

[22] Filed: Apr. 6, 1979

[51] Int. Cl.³ .............................................. G05B 7/00
[52] U.S. Cl. .................................. 318/591; 318/592; 318/609; 318/597
[58] Field of Search ............... 318/590, 591, 592, 609, 318/598, 597, 610

[56] References Cited

U.S. PATENT DOCUMENTS 3,946,297 3/1976 Bechtel .............................. 318/609

Primary Examiner—J. V. Truhe
Assistant Examiner—Eugene S. Indyk

Attorney, Agent, or Firm—Nathan Edelberg; Robert P. Gibson; William J. Sheehan

[57] ABSTRACT

A system for performing target acquisition and tracking under the control of a human operator. The system has a slewable sensor with a line of sight and includes apparatus for slewing the sensor to align its line of sight with a target, the difference between the position of the target and the line of sight being a line of sight error. A display displays the line of sight error to the operator at either a first or a second magnification, selectable by the operator. The operator uses a control manipulator to generate input signals and supply them to the rest of the system. Circuitry is provided for automatically switching from proportional to proportional-plus-integral control upon changing from the first to the second magnification. Circuitry is also provided for initializing an integrator prior to the switchover from the first to the second magnification to eliminate control transients in the concomitant switchover from proportional to proportional-plus-integral control.

7 Claims, 1 Drawing Figure

AUTOMATIC INTEGRATOR CONTROL FOR TRANSIENTLESS SWITCHING OF CONTROLLER GAINS IN MANUAL TRACKING SYSTEMS

BACKGROUND OF THE INVENTION

This invention relates to manual tracking systems having multipower displays and in particular to such systems involving a switchover from proportional to proportional-plus-integral control of the sensor upon a change of optical magnification.

Manual tracking systems employing multipower displays require switching of the gain of the sensor controller to offset optical magnification changes. Specifically, as the display is switched from low to high magnification there must be a simultaneous offsetting reduction of the controller gain in order to maintain stable control of the sensor. This gain reduction causes several problems including a step change in commanded sensor line of sight rate, often causing loss of target track; reduction in the dynamic range of the sensor line of sight rate control, thereby precluding engaging targets when large line of sight rates are involved; and the presence after switchover of a nonneutral controller position and force, which causes inaccurate target tracking. Current systems address these problems, but do not wholly solve them, by providing a subsequent manual switchover from proportional to proportional-plus-integral control of the sensor. In particular, these systems require the manual switching-in of a rate-aiding parallel integrator which takes over the steady state and low frequency components of the commanded line of sight rate, thereby allowing the operator to track the target about a more neutral controller position and force while somewhat increasing the dynamic range of the controller. The integrator gain must be low enough, however, to permit gradual transfer of control from the operator to the integrator. Otherwise target tracking becomes disrupted. Consequently, the dynamic range of control, while improved, still remains restricted. In addition, the gradual transfer of control takes a relatively long time, typically five to fifteen seconds, during which time tracking is inaccurate. These systems have an additional problem in that manual switching-in of the integrator occurs at a critical moment when the operator is preoccupied with compensating for the control transients which result from the low-to-high magnification switchover, tracking about a non-neutral controller position and/or force, and continuous visual fixation on the display. Because of these factors switching of the integrator must be done by feel, which naturally leads to errors.

The following U.S. patents are representative of the prior art: U.S. Pat. Nos. 2,998,942; 3,711,046; 3,733,133; 3,829,659; and 4,038,547.

SUMMARY OF THE INVENTION

Among the several objects of this invention may be noted the provision of a manual tracking system with improved target tracking upon switchover from low to high magnification; the provision of such a system with improved dynamic range of the sensor line of sight rate control upon switchover; the provision of such a system capable of engaging targets even when high line of sight rates are involved; the provision of such a system which has improved target tracking after switchover; the provision of such a system having a substantially neutral controller position and force after switchover; the provision of such a system which does not require the manual switching-in of a rate-aiding parallel integrator upon switchover from low to high magnification; the provision of such a system having a rate-aiding parallel integrator with a relatively high gain; the provision of such a system in which the rate-aiding parallel integrator is instantaneously transferred into the system upon switchover; the provision of such a system that eliminates control transients upon switchover from proportional to proportional-plus-integral control; the provision of such a system that shortens target-acquisition time; the provision of such a system that reduces operator effort and skill requirements; and the provision of such a system which eliminates the errors inherent in the operator manually switching-in the rate-aiding parallel integrator.

Briefly, the manual tracking system of this invention has a slewable sensor with a line of sight and includes slewing means, display means, magnification selection means, operator input means, and a control signal means. The slewing means slews the sensor to align its line of sight with a target, the difference between the position of the target and the line of sight being a line of sight error. The display means displays the line of sight error to the operator and includes means for displaying the line of sight error at a first magnification and means for displaying said error at a second magnification. The magnification selection means is operator controllable to switch the display means from the first to the second magnification. The operator controllable input means generates an input signal to which the control signal means is responsive to supply control signals to the slewing means. The control signal means includes means for generating a first control signal which is proportional to the input signal and for generating a second control signal which is proportional to the input signal plus its integral. The slewing means is responsive to the first control signal to slew the sensor in proportion to the input signal and is further responsive to the second input signal to slew the sensor in proportion to the input signal plus its integral. The control signal means also includes control switching means responsive to the magnification selection means for automatically switching the control signal means from supplying the first control signal to supplying the second control signal substantially simultaneously with the switching of the display means from the first to the second magnification. When the line of sight error is displayed at the first magnification the slewing means slews the sensor in proportion to the input signal and when said error is displayed at the second magnification the slewing means slews the sensor in proportion to the input signal plus its integral.

Other objects and features will be in part apparent and in part pointed out hereinafter.

BRIEF DESCRIPTION OF THE DRAWING

Corresponding reference characters indicate corresponding parts throughout the drawing.

DESCRIPTION OF THE PREFERRED EMBODIMENT

Figure 1:
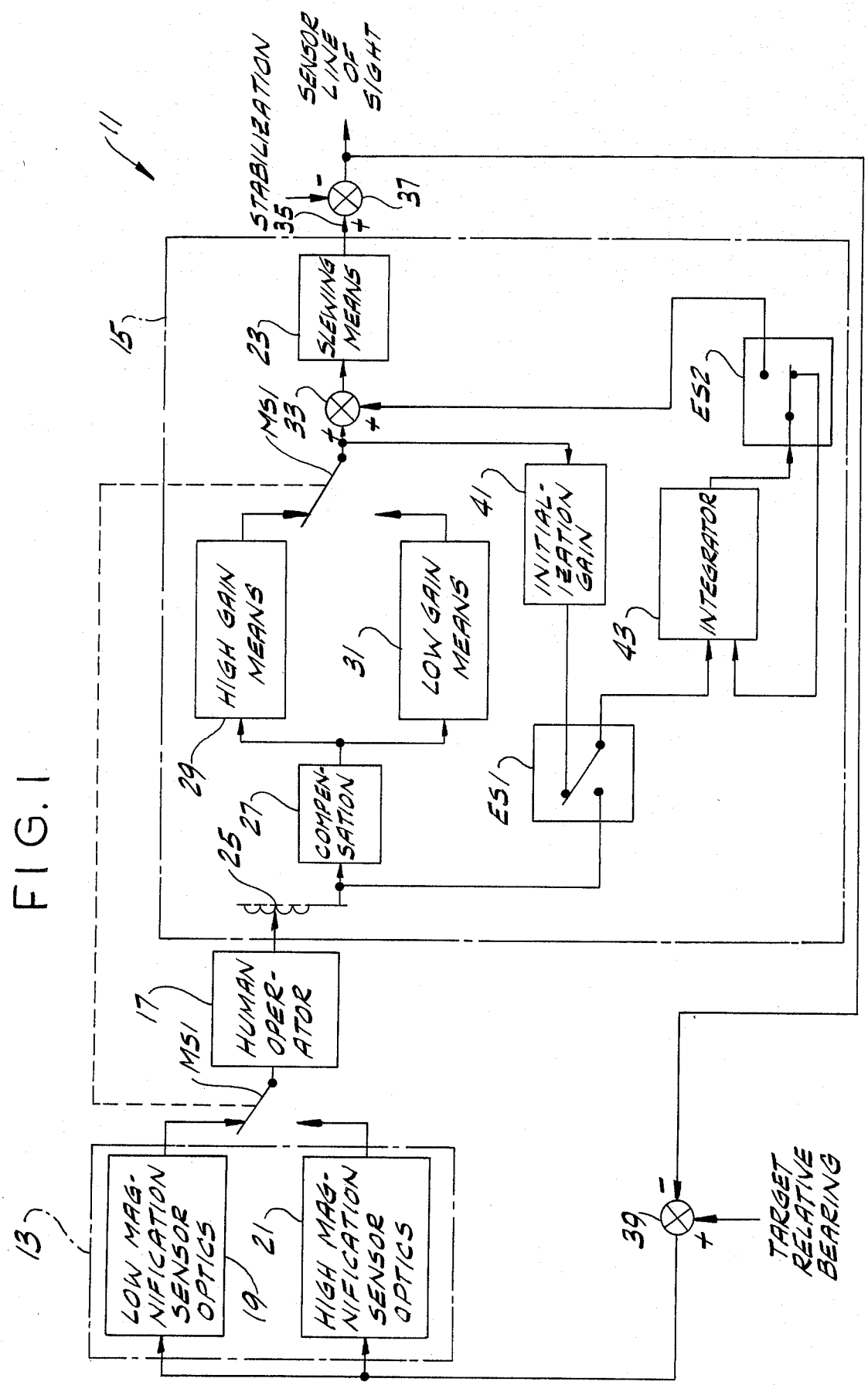
FIG. 1 is a block diagram of the manual tracking system of the present invention.

Referring now to the drawing, the manual tracking system of this invention is indicated generally at 11 and includes a display 13 and a controller 15. The purpose of system 11 is to align the line of sight of a sensor (not shown), which illustratively is of the type described in the aforementioned U.S. patents, with a target. The difference between the line of sight of the sensor and the position of the target is displayed on display 13 to a human operator 17. As is explained below, the human operator uses the information displayed on the sensor to align the sensor's line of sight with the target. The sensor has a low magnification, e.g., 1X, and a high magnification, e.g., 10X. The human operator uses a manual switch MS1 to switch back and forth between low magnification, indicated by block 19, and high magnification, indicated by block 21. Of course, when low sensor magnification is used the magnification of the display is also low and when high sensor magnification is used the magnification of the display is high. Thus, switch MS1 constitutes operator controllable magnification selection means for switching the display means from a first to a second magnification. Low sensor/display magnification is used to provide a wide detection field of view and high magnification is used once the target is in a narrower field of view.

The means for mechanically moving or slewing the sensor is shown at 23, said means being of the type described in the aforesaid U.S. patents. That is, slewing means 23 constitutes means for slewing the sensor to align the sensor's line of sight with a target. The human operator uses controller 15 to align the sensor's line of sight with the target and in particular uses a control manipulator 25 which constitutes means for generating input signals corresponding to the desired slewing of the sensor. The input signal is supplied to a compensation gain block 27, which can damp or amplify the input signal as desired for the particular system under consideration. The output of gain block 27 is supplied to a high gain means 29 and to a low gain means 31. The outputs of gain means 29 and 31 are both control signals proportional to the input signal but the gain of means 29 is ten times that of means 31. Thus, means 29 constitutes means for generating a control signal proportional to the input signal from the control manipulator at a high gain and means 31 constitutes means for generating a control signal proportional to the input signal at a low gain. The control signals from either the high gain means or the low gain means are supplied through manually operable switch MS1 and a summing junction 33 to slewing means 23, which thereupon slews the sensor an amount and direction corresponding to the control signal received from summing junction 33. Thus, manual switch MS1 also constitutes means for supplying the signal from high gain means 29 to the slewing means when the line of sight error is displayed at low magnification and for supplying the signal from low gain means 31 to the slewing means when said error is displayed at high magnification. As shown in FIG. 1, when low magnification optics are being used, i.e., the line of sight error is being displayed at low magnification, the control signal is taken from high gain means 29. The slewing means in response to the control signal from means 29 slews the sensor in proportion to the input signal. Thus, those parts of controller 15 other than the control manipulator and the slewing means constitute control signal means responsive to the input signal from the control manipulator for supplying control signals to the slewing means. On the other hand, when high magnification optics are used, switch MS1 is in its lower position and the low gain control signal from low gain means 31 is supplied to slewing means 23, thereby compensating for the tenfold increase in optical magnification by a tenfold decrease in controller gain.

A signal corresponding to the direction of the sensor's line of sight, indication by an arrow 35, is supplied to a summing junction 37 as is a stabilization signal such as that described in U.S. Pat. No. 3,829,659. The output of summing junction 37, representing the actual line of sight of the sensor, is supplied to another summing junction 39. The other input to summing junction 39 is a signal, acquired in any of the ways described in the aforesaid U.S. patents, representing the relative bearing of the target. Hence the output of junction 39 is a signal representing the difference between the target's position and the sensor's line of sight, i.e., the line of sight error. This signal is supplied to display 13 and displayed to the operator at whichever magnification is then being used. That is, display 13 constitutes means for displaying the line of sight error to the operator, said display having means for displaying said error at a first magnification and means for displaying said error at a second magnification. Thus, it can be seen that system 11 forms a closed loop with the human operator being the connecting link between the display and the controller. The operator continuously views the display and operates control manipulator 25 to reduce the line of sight error displayed on the display. Once the error has been reduced to a sufficient degree, operator 17 actuates switch MS1 to increase the sensor/display magnification and concomitantly reduce the gain of controller 15 and thereafter continues to reduce the error through the use of manipulator 25.

The parts of the system briefly described above are known in the art and are not part of applicant's invention except in combination with the following: The remainder of manual tracking system 11 consists of an initialization gain block 41 having a gain equal to $(K_1 - K_2)/K_1$, where $K_1$ is the gain of means 29 and $K_2$ is the gain of means 31, an integrator 43 and two electronic switches ES1 and ES2. Integrator 43 and switches ES1 and ES2 constitute means for supplying a signal proportional to the integral of the input signal to the slewing means when the line of sight error is displayed at high magnification, but not when the error is being displayed at low magnification. When manual switch MS1 is in the position shown in FIG. 1, the connections through electronic switches ES1 and ES2 are also as shown in FIG. 1; but upon switch MS1 being moved to the high magnification/low controller-gain position, electronic switches ES1 and ES2 automatically and substantially simultaneously with the switching of switch MS1 change the connections therethrough to provide for proportional-plus-integral control of the sensor. That is, in the low magnification situation (shown in FIG. 1) the output of high gain means 29, which represents the commanded line of sight rate, is continuously sampled by integrator 43 after it is attenuated by gain block 41. Specifically, the output of means 29 is supplied to block 41 and the attenuated output of block 41 is supplied to integrator 43 through electronic switch ES1. In addition, the output of integrator 43 is fed back to the integrator through switch ES2, thereby configuring the integrator as a continuous sampler with a time constant of 0.01 sec. and a static gain of one. This initializes the integrator so that upon switchover to high magnification/low controller gain the output of the integrator can be added to the output of low gain means 31 at summing junction 33 to result in no change in the input to the slewing means upon switchover. Thus, switches ES1 and ES2, initialization block 41 and high gain means 29 together constitute means for automatically initializing the integrator during the time the line of sight error is displayed at the low magnification so that control transients do not occur upon switchover from low to high magnification. The signal deficit from reduced controller gain (caused by switching from high gain means 29 to low gain means 31) is exactly made up by the addition of the initialized integrator output. Upon switchover, electronic switch ES1 disconnects initialization gain block 41 from integrator 43 and reconnects the input of the integrator directly to control manipulator 25. Thus, electronic switch ES1 constitutes means for supplying the signal from high gain means 29 to the integrator when the line of sight error is displayed at the low magnification and for supplying the input signal from the control manipulator directly to the integrator when said error is displayed at the high magnification. And switch ES2 disconnects the output of integrator 43 from its input and reconnects it to summing junction 33, thereby connecting integrator 43 in parallel with low gain means 31 to provide proportional-plus-integrator control of the sensor. Thus low gain means 31 and integrator 43 constitute means for generating a control signal which is proportional to the input signal plus its integral. And electronic switches ES1 and ES2 constitute means responsive to, i.e., governed by, manual switch MS1 for automatically switching the controller from supplying a proportional control signal from high gain means 29 to supplying a proportional-plus-integral control signal from low gain means 31 and integrator 43 to the slewing means substantially simultaneously with the switching of display 13 from the first to the second magnification. In addition, electronic switch ES2 constitutes means for configuring the integrator as a continuous sampler when the line of sight error is displayed at low magnification and for supplying the signal from the integrator to the slewing means when the error is displayed at high magnification. The slewing means, of course, is responsive to this control signal to slew the sensor in proportion to the input signal plus its integral. Thus, when the line of sight error is displayed at the high magnification, the slewing means slews the sensor in proportion to the input signal plus its integral. The integrator thereupon takes over the steady state and low frequency components of the commanded line of sight rate, thereby allowing the operator to track about a more neutral control position and force while increasing dynamic range of the controller. And since, because of the initialization of the integrator, there is no change in the input to the slewing means upon switchover to high magnification, control transients do not occur. Furthermore, using the present system the gain of the integrator can be increased to provide a larger dynamic range than that of prior art devices since the transition of control from operator to integrator is changed from a gradual process taking five to fifteen seconds to an instantaneous occurrence. This also provides immediate tracking at high magnification about a neutral controller position and force. And, finally, the manual switching of the integrator into the circuit is eliminated in the present invention.

Although the present invention has been described with reference to bumpless switching from proportional to proportional-plus-integral control, it should be appreciated that the present invention is applicable to bumpless control transfer between manual and automatic tracking loops and these systems are considered to be the equivalent to the system described above. Therefore, it is intended that all matter contained in the above description or shown in the accompanying drawing shall be interpreted as illustrative and not in a limiting sense.

What is claimed is:

1. A manual tracking system for performing target acquisition and tracking under the control of a human operator, said system having a slewable sensor with a line of sight, comprising:

slewing means for slewing said sensor to align said line of sight with a target, the difference between the position of the target and the line of sight being a line of sight error;

display means for displaying the line of sight error to the operator, said display means including means for displaying said line of sight error at a first magnification and means for displaying said line of sight error at a second magnification;

operator controllable magnification selection means for switching the display means from the first to the second magnification, whereby the operator can selectively display the line of sight error at either magnification;

operator controllable input means for generating an input signal corresponding to the slewing of the sensor desired by the operator to align the sensor line of sight with the target; and control signal means responsive to the input signal for supplying control signals to the slewing means, said control signal means including means for generating a first control signal which is proportional to the input signal and for generating a second control signal which is proportional to the input signal plus its integral, said slewing means being responsive to the first control signal to slew the sensor in proportion to the input signal and being responsive to the second input signal to slew the sensor in proportion to the input signal plus its integral, said control signal means including integrator means for supplying a signal proportional to the integral of the input signal to the slewing means when the line of sight error is displayed at the second magnification;

said control signal means also including control switching means governed by the operator controllable magnification selection means for automatically switching the control signal means from supplying the first control signal to supplying the second control signal substantially simultaneously with the switching of the display means from the first to the second magnification, whereby when the line of sight error is displayed at the first magnification the slewing means slews the sensor in proportion to the input signal and when said error is displayed at the second magnification the slewing means slews the sensor in proportion to the input signal plus its integral.

2. A manual tracking system as set forth in claim 1 wherein the control signal means includes means for configuring said integrator means as a continuous sampler when said error is displayed at the first magnification.

3. A manual tracking system as set forth in claim 1 wherein the control signal means includes first gain means for generating a control signal proportional to the input signal at a first gain and second gain means for generating a control signal proportional to the input signal at a second gain, said magnification selection means including means for supplying the signal from the first gain means to the slewing means when the line of sight error is displayed at the first magnification and for supplying the signal from the second gain means to the slewing means when the line of sight error is displayed at the second magnification.

4. A manual tracking system as set forth in claim 3 wherein the control signal means further includes means for supplying to said integrator means the signal from the first gain means when the line of sight error is displayed at the first magnification and for supplying said input signal directly to said integrator means when said error is displayed at the second magnification.

5. A manual tracking system as set forth in claim 3 wherein the control signal means further includes means for supplying the signal from the first gain means to said integrator means when the line of sight error is displayed at the first magnification, and means for configuring said integrator means as a continuous sampler when the line of sight error is displayed at the first magnification and for supplying the signal from the integrator means to the slewing means when the line of sight error is displayed at the second magnification, whereby the slewing means is supplied the signal from the first gain means when the line of sight error is displayed at the first magnification and the slewing means is supplied both the signal from the integrator means and the signal from the second gain means when the line of sight error is displayed at the second magnification.

6. In a target tracking and acquisition system under the control of a human operator, said system having a sensor and display switchable from a low to a high magnification, operator controllable means for switching from said low to said high magnification, and a controller having means for providing proportional control of the sensor, said controller also having a rate-aiding parallel integrator constituting means for providing integral control of the sensor and in conjunction with the proportional control means of the controller constituting means for providing proportional-plus-integral control, the improvement comprising: means for initializing the integrator during low magnification of the sensor and display and means for automatically and instantaneously switching from proportional to proportional-plus-integral control of the sensor when the magnification of the sensor and display is switched from low to high; said controller including means for providing proportional control of the sensor at a high gain and means for providing proportional control of the sensor at a low gain, wherein the operator controllable switching means includes means for changing the gain of the proportional control from high to low when the magnification of the sensor and display is increased from low to high to compensate therefor, further including electronic switching means governed by the operator controllable switching means for supplying the integrator with a high gain proportional signal and for configuring the integrator as a continuous sampler when the sensor and display are at low magnification thereby to initialize the integrator for operation of the system at high sensor and display magnification so that control transients do not occur upon switchover from low to high magnification.

7. The target tracking and acquisition system as set forth in claim 6 wherein one electronic switch is connected between the high gain means and the integrator to provide a high gain proportional signal to the integrator when the sensor and display are at low magnification.

* * * * *